(12) United States Patent
Rane et al.

(10) Patent No.: US 10,966,086 B2
(45) Date of Patent: Mar. 30, 2021

(54) SYSTEM AND METHOD FOR SECURELY ENABLING A USER WITH A MOBILE DEVICE TO ACCESS THE CAPABILITIES OF A STANDALONE COMPUTING DEVICE

(71) Applicant: Palo Alto Research Center Incorporated, Palo Alto, CA (US)

(72) Inventors: Shantanu Rane, Menlo Park, CA (US); Alejandro E. Brito, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 189 days.

(21) Appl. No.: 16/184,811

(22) Filed: Nov. 8, 2018

(65) Prior Publication Data

US 2020/0154271 A1     May 14, 2020

(51) Int. Cl.
| | |
|---|---|
| H04W 12/06 | (2021.01) |
| H04L 9/30 | (2006.01) |
| H04L 9/32 | (2006.01) |
| H04L 29/06 | (2006.01) |
| H04N 1/44 | (2006.01) |

(52) U.S. Cl.
CPC .............. *H04W 12/06* (2013.01); *H04L 9/30* (2013.01); *H04L 9/3242* (2013.01); *H04L 63/083* (2013.01); *H04L 63/0861* (2013.01); *H04L 63/102* (2013.01); *H04L 63/166* (2013.01); *H04N 1/4426* (2013.01); *H04N 1/4433* (2013.01); *H04N 2201/0094* (2013.01)

(58) Field of Classification Search
CPC ................................ H04W 12/06; H04L 9/30
USPC ........................................................... 726/4
See application file for complete search history.

(56) References Cited

U.S. PATENT DOCUMENTS

| | | | |
|---|---|---|---|
| 2015/0188715 A1* | 7/2015 | Castellucci | H04L 9/3265 713/178 |
| 2016/0179449 A1 | 6/2016 | Cho | |
| 2017/0093824 A1* | 3/2017 | Shulman | H04L 63/1433 |
| 2019/0372759 A1* | 12/2019 | Rix | H04L 9/0838 |

FOREIGN PATENT DOCUMENTS

WO     2018160863 A1    9/2018

* cited by examiner

*Primary Examiner* — Anthony D Brown
(74) *Attorney, Agent, or Firm* — Shun Yao; Park, Vaughan, Fleming & Dowler LLP

(57) ABSTRACT

One embodiment facilities user access to a standalone computing device. During operation, the system receives, by the standalone computing device from a mobile computing device associated with a user, a first command to access capabilities of the standalone computing device, wherein the first command includes an ephemeral user identifier which includes an ephemeral key and indicates user-specific metadata, wherein the ephemeral key is generated by a network service, wherein the ephemeral user identifier is digitally signed with a private key of the network service, and wherein the standalone computing device is not directly accessible by the network service. The system verifies, by the standalone computing device using a public key of the network service, that the ephemeral user identifier was generated by the network service. The system executes, by the standalone computing device, the first command based on the user-specific metadata.

20 Claims, 12 Drawing Sheets

USER-SPECIFIC
METADATA 200

TABLE 210
(FOR MACHINE
TYPE 211)

| USERNAME 212 | CASH BALANCE 214 | PAGE BALANCE 216 | USER PREFERENCES 218 |
|---|---|---|---|
| joe.y.smith | $26.20 | 260 pages | { portrait, double-sided, black/white } |
| ... | ... | ... | ... |

ENTRY 220

TABLE 230
(FOR MACHINE
TYPE 231)

| USERNAME 232 | CASH BALANCE 234 | PAGE BALANCE 236 | USER PREFERENCES 238 |
|---|---|---|---|
| joe.y.smith | $158.88 | n/a | { landscape, single-sided, color } |
| ... | ... | ... | ... |

ENTRY 240

FIG. 2

SYSTEM AND METHOD FOR SECURELY ENABLING A USER WITH A MOBILE DEVICE TO ACCESS THE CAPABILITIES OF A STANDALONE COMPUTING DEVICE

BACKGROUND

Field

This disclosure is generally related to electronic communication. More specifically, this disclosure is related to a system and method for securely enabling a user with a mobile device to access the capabilities of a standalone computing device.

Related Art

The proliferation of the Internet and e-commerce continues to create a vast amount of digital content. In a conventional system, when a user wishes to access digital content on or the capabilities of a computing device, via the user's mobile device, the computing device to be accessed is typically on a network, and accessible via an interface to the computing device on that network. For example, if a user wishes to access the capabilities of a multifunction printer (e.g., to print out a document on the multifunction printer), both the user's mobile device and the multifunction printer must be accessible via the same network. However, if this multifunction printer is not on the network, the user can not access the multifunction printer.

Furthermore, certain application-specific operations are typically accomplished via a network service, which can manage the operation of various computing devices. For example, authenticating the user, authorizing the user to access capabilities of a particular computing device, updating the user's account privileges, and providing user-specific personalization are typically tasks which are managed and monitored by a network service. A network service can include a cloud-based server, or any other computing device or computing entity which can manage multiple other devices, and perform these exemplary types of application-specific operations.

In a conventional system, a user with a mobile device can only access the functionality of a computing device (e.g., a multifunction printer) if the computing device is on a network which is also accessible by the mobile device. The user may need to rely upon other computing devices to perform these application-specific operations, which can limit or restrict the user's ability to access the functionality of specific computing device. Some current solutions to alleviating this reliance assume the existence of an administrative computing entity connected to the computing device, which performs the application-specific operations described above. One example is when the computing device is part of a fleet of managed devices (e.g., a fleet of multifunction printers). However, there is currently no mechanism by which a user with a mobile device may access the capabilities of a "standalone" computing device (i.e., a computing device which is not accessible via a network service or a cloud-based server) without also using an administrative computing entity.

SUMMARY

One embodiment facilitates user access to a standalone computing device. During operation, the system receives, by the standalone computing device from a mobile computing device associated with a user, a first command to access capabilities of the standalone computing device, wherein the first command includes an ephemeral user identifier which includes an ephemeral key and indicates user-specific metadata, wherein the ephemeral user identifier is unique to the first command, wherein the ephemeral key is generated by a network service, wherein the ephemeral user identifier is digitally signed with a private key of the network service, and wherein the standalone computing device is not directly accessible by the network service. The system verifies, by the standalone computing device using a public key of the network service, that the digitally signed ephemeral user identifier was generated by the network service. The system executes, by the standalone computing device, the first command based on the user-specific metadata by accessing the capabilities of the standalone computing device.

In some embodiments, the system transmits, by the standalone computing device to the mobile computing device, a notification indicating a successful execution of the first command, wherein the mobile computing device transmits the notification to the network service, which causes the network service to update an entry in a data structure, and wherein the entry corresponds to the user-specific metadata.

In some embodiments, the system pairs, by the standalone computing device, with the mobile computing device wirelessly based on one or more of: WiFi-Direct; Bluetooth; Near Field Communication (NFC); a wireless protocol; and a wireless protocol which does not involve a wireless access point or a wireless router.

In some embodiments, the digitally signed ephemeral user identifier is received by the mobile computing device prior to the standalone computing device receiving the first command, and prior to the user receiving the digitally signed ephemeral user identifier, the user is authenticated by the network service based on or more of: an application on the mobile computing device; a website; a form of biometric recognition via a component of the mobile computing device; and a password of the user to access the application or the website.

In some embodiments: the ephemeral user identifier is transmitted via a network from the network service to the mobile computing device; the ephemeral user identifier is further verified by the mobile computing device using the public key of the network service prior to transmitting the first command to the standalone computing device; the first command is transmitted by the mobile computing device to the standalone computing device; and the user-specific metadata is stored by the network service, which allows the standalone computing device to verify that the mobile computing device is associated with a user which has been previously authorized by the network service.

In some embodiments: the ephemeral user identifier is hidden from the mobile computing device based on an encryption of the ephemeral user identifier and a message authentication code; the encryption is performed using a session key derived based on a secure cryptographic handshake protocol between the standalone computing device and the network service; and the secure cryptographic handshake protocol utilizes the mobile computing device as an untrusted relay.

In some embodiments, the network service comprises a cloud-based server, and the standalone computing device is not connected to the cloud-based server via any networks or any wireless access points.

In some embodiments, prior to the network service transmitting the digitally signed ephemeral user identifier to the mobile computing device, the system establishes a first secure connection based on a Transport Layer Security protocol between the mobile computing device and the network service. Prior to the standalone computing device receiving the first command, the system establishes a second secure connection based on the Transport Layer Security protocol between the mobile computing device and the standalone computing device.

In some embodiments, the standalone computing device is one or more of: a multifunction printer; an Internet of Things (IoT)-capable device; and a robot.

BRIEF DESCRIPTION OF THE FIGURES

FIG. 2 presents tables for facilitating user access to a standalone computing device, including user-specific metadata, in accordance with an embodiment of the present invention.

In the figures, like reference numerals refer to the same figure elements.

DETAILED DESCRIPTION

Figure 1A:
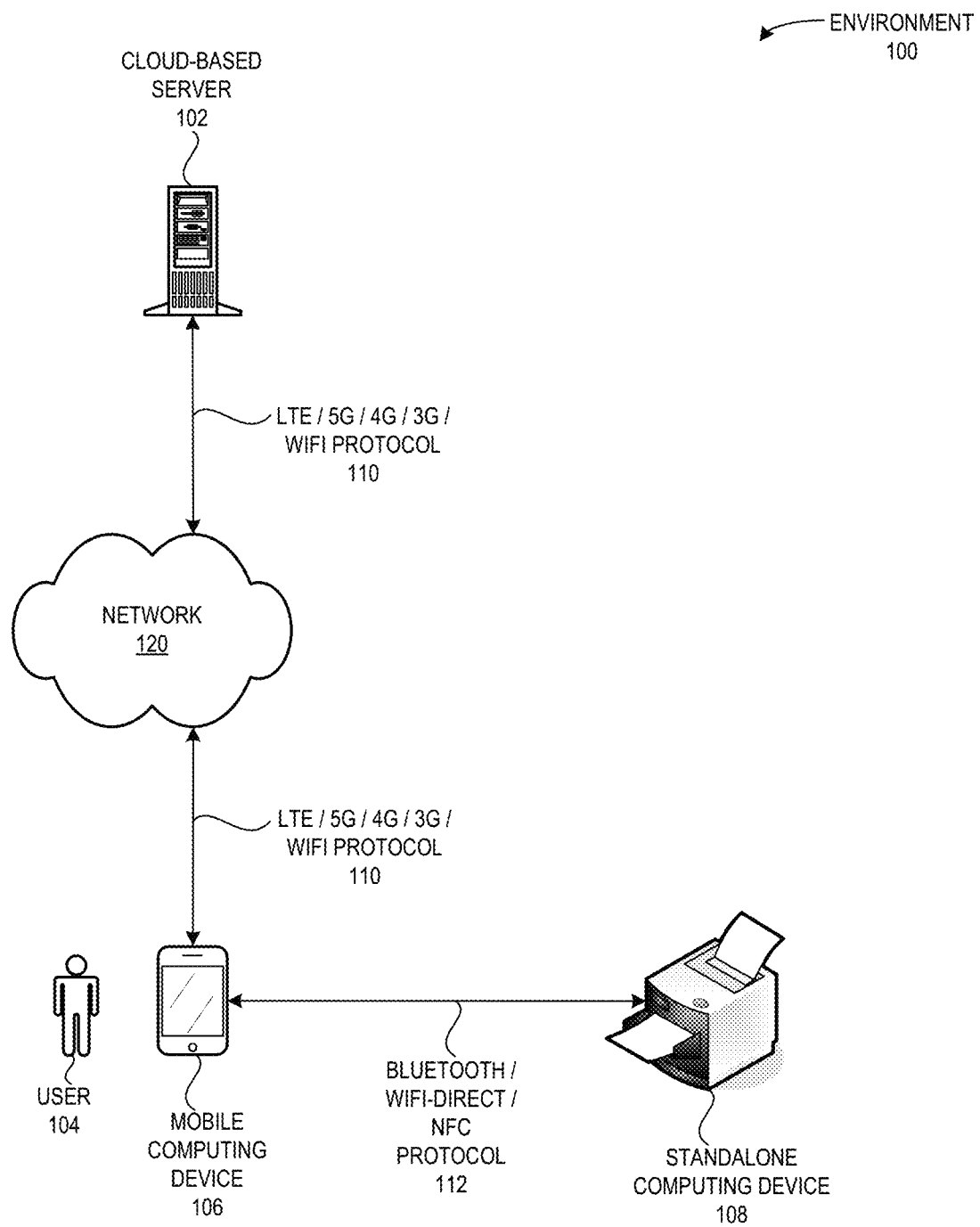
FIG. 1A illustrates an exemplary environment for facilitating user access to a standalone computing device, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which solves the problem of allowing a user with a mobile device to access the capabilities of a standalone computing device.

In a conventional system, when a user wishes to access digital content on or the capabilities of a computing device, via the user's mobile device, the computing device to be accessed is typically on a network, and accessible via an interface to the computing device on that network. For example, if a user wishes to access the capabilities of a multifunction printer (e.g., to print out a document on the multifunction printer), both the user's mobile device and the multifunction printer must be accessible via the same network. However, if this multifunction printer is not on the network, the user can not access the multifunction printer.

Furthermore, certain application-specific operations are typically accomplished via a network service, which can manage the operation of various computing devices. For example, authenticating the user, authorizing the user to access capabilities of a particular computing device, updating the user's account privileges, and providing user-specific personalization are typically tasks which are managed and monitored by a network service. A network service can include a cloud-based server, or any other computing device or computing entity which can manage multiple other devices, and perform these exemplary types of application-specific operations.

In a conventional system, a user with a mobile device can only access the functionality of a computing device (e.g., a multifunction printer) if the computing device is on a network which is also accessible by the mobile device. The user may need to rely upon other computing devices to perform these application-specific operations, which can limit or restrict the user's ability to access the functionality of specific computing device. Some current solutions to alleviating this reliance assume the existence of an administrative computing entity connected to the computing device, which performs the application-specific operations described above. One example is when the computing device is part of a fleet of managed devices (e.g., a fleet of multifunction printers). However, there is currently no mechanism by which a user with a mobile device may access the capabilities of a "standalone" computing device (i.e., a computing device which is not accessible via a network service or a cloud-based server) without also using an administrative computing entity.

The embodiments described herein provide a system which solves the problem of allowing a user with a mobile device to access the capabilities of a standalone computing device. In one exemplary embodiment: the standalone computing device is a standalone multifunction printer (MFP); the user's mobile device is a smartphone with a data connection ("mobile device"); and the network service is a cloud-enabled device ("cloud-based server") that communicates with the smartphone but not with the MFP. The user's mobile device can obtain the public key of the cloud-based server via any known method. The standalone computing device can obtain the public key of the cloud-based server via, e.g., inclusion at the time of manufacture or a firmware upgrade.

The user can register with the cloud-based server, and set up account credentials by which the user can authenticate to the cloud-based server. For example, the user can set up a user name, a password, and a form of biometric recognition.

Subsequently, the user (via the user's mobile device) can request access to the MFP via an authentication process with the cloud-based server, based on the user's account credentials. The cloud-based server can generate an ephemeral user identifier, which can include an ephemeral key (which is unique and generated for a specific command) and user-specific metadata (which can be obtained from a data structure stored by the cloud-based server and can include preferences/settings of the user). Using the cloud-based server's own private key, the cloud-based server can digitally sign the generated ephemeral user identifier, and send the digitally signed ephemeral user identifier to the user's mobile device.

Subsequently, the user's mobile device can verify the digitally signed ephemeral user identifier, by using the cloud-based server's public key to verify that the ephemeral user identifier was signed by the cloud-based server. The user's mobile device can then send the appropriate command to the MFP, where the command can include the digitally signed ephemeral user identifier. The MFP can also verify the digitally signed ephemeral user identifier in the same manner (i.e., by using the cloud-based server's public key), and upon a successful verification, execute the command.

A first secure connection between the user's mobile device and the cloud-based server can be based on a first Transport Layer Security (TLS) protocol handshake, via, e.g., a Long Term Evolution (LTE), 5G, 4G, 3G, or WiFi protocol. This first connection can be established prior to the registration process and/or the request to access the MFP. A second secure connection between the user's mobile device and the MFP can be based on a second TLS protocol handshake, over, e.g., a WiFi-Direct or a Bluetooth or an NFC channel. This second connection can be established prior to the user's mobile device sending the command to the MFP. It is understood that, as a precursor to establishing any TLS handshake or a key agreement protocol, the standalone computing device, the mobile device, and the cloud service each possesses a key pair comprising a public encryption key and a private decryption key, and a certificate assigned by an appropriate certificate authority. A certificate authority is essential for authenticating the keys assigned to a given entity. As known in the art, each of the three devices can use keys signed by the same certificate authority or by different certificate authorities. In all the embodiments below, whenever key agreement based on public key cryptography is described, we assume that the keys have been assigned by a key authority, and are accompanied by a certificate issued by the key authority. An exemplary communication is described below in relation to FIGS. 1B and 3A-3E.

In the embodiments described herein, the system allows the user's mobile device to become a root of trust which authenticates the user, while using a network connection to relay credentials from the cloud-based server to the standalone computing device via the user's mobile device. Furthermore, the embodiments of the described system improve the conventional systems by eliminating the complexity, maintenance, and expense of an always-present administrative computing service that manages devices in the fleet. The system shifts this function to a cloud-based server which only communicates with users of the fleet on an as-needed basis. As a result, the system also eliminates the need for the computing devices in the fleet to be connected to an always-present network, as long as the computing devices are able to pair opportunistically with a user's mobile device.

The system further eliminates the complicated setup phase, in which the computing devices in the fleet must be configured so that they can pass specific user credentials and specific user information to the administrative computing service. Instead, a new computing device in the fleet only needs to be able to communicate with a user's mobile device. The system also eliminates the need for the user to be in the same network as the computing devices in the fleet.

Thus, the embodiments described herein provide a computer system which improves the ability of a user's mobile device to access the capabilities of a standalone computing device (such as an MFP). By allowing the user's mobile device to become a root of trust, the system can eliminate the need for an always-present administrative computing service which manages a fleet of computing devices. The system provides an improvement to the manner in which a user's mobile device can access a standalone computing device, as described herein. The system thus enhances and improves the technological area of data access by allowing the user to access physical (or other) capabilities of a standalone computing device, without requiring either the overhead of an always-present administrative entity or a network connection between such an always-present administrative entity and the computing device in the fleet.

The claimed system is a technological solution (using digitally signed ephemeral user identifiers in a system as described herein) to a technological problem (accessing digital data in a standalone computing device and improving the efficiency of digital communications over a network). Furthermore, the improvements are fundamentally technological, can result in a more efficient digital communications, and can be applied to a variety of practical, concrete, and tangible applications, as described herein.

The term "network service" refers to a server or a computing device or a computing entity which is accessible via, e.g., an LTE, 5G, 4G, 3G, or WiFi protocol. A network service can provide application-specific operations, including authentication, authorization, and accounting. A network service can also store information (e.g., metadata) associated with multiple users (e.g., user-specific metadata). A "cloud-based server" can be an example of a network service.

The terms "mobile device" and "mobile computing device" are used interchangeably in this disclosure, and can include, e.g., a smartphone, a tablet, a laptop, and a computer.

The term "standalone computing device" can refer to any computing device which is not accessible via a wireless protocol which involves a wireless access point or a wireless router. A user's mobile device can pair with a standalone computing device using a pairing protocol over, e.g., WiFi-Direct, Bluetooth, a wireless protocol, and a wireless channel which does not involve a wireless access point or a wireless router. Examples of a standalone computing device include a multifunction printer, an Internet of Things (IoT)-capable device, and a robot.

Exemplary Environment and Communication

FIG. 1A illustrates an exemplary environment 100 for facilitating user access to a standalone computing device, in accordance with an embodiment of the present invention. Environment 100 can include: a cloud-based server 102; a mobile computing device 106 associated with a user 104; and a standalone computing device 108. Cloud-based server 102 can communicate with mobile computing device 106 via a wireless protocol which involves a wireless access point or a wireless router, via, e.g., an LTE/5G/4G/3G/WiFi protocol 110. Specifically, cloud-based server 102 and mobile computing device 106 can communicate with each other via a network 120. Mobile computing device 106 can also communicate with standalone computing device 108 via a wireless protocol which does not involve a wireless access point or a wireless router, via, e.g., a Bluetooth/WiFi-Direct/NFC protocol 122. Standalone computing device 108 is not connected to network 120 or to any other networks.

Mobile computing device 106 can be any computing device or client computing device with wireless capabilities, e.g., a laptop, a tablet, a smartphone, a mobile device, and a computer. Standalone computing device 108 can be, e.g., a multi-function printer (MFP), an Internet of Thing (IoT)-capable device, or a robot. Standalone computing device 108 may be presented to user 104 (on the display of mobile computing device 106) as part of a menu of available MFPs, for example, in a specific application on mobile computing device 106. The specific application can be a private company application, a customer application, or an employer application. Standalone computing device 108 may also be presented to user 104, by automatically appearing on the lock-screen of mobile computing device 106 whenever user 104 is in the "vicinity" of standalone computing device 108. This automatic display can occur after a secure connection has been established between mobile computing device 106 and standalone computing device 108 (e.g., a TLS handshake 146 as described below in relation to FIG. 1B). Note that the "vicinity" of standalone computing device 108 can be defined as a physical space or area within a predetermined distance of standalone computing device 108, e.g., a distance within which a Bluetooth or NFC or Wi-Fi Direct connection can be established with mobile computing device 106.

Figure 1B:
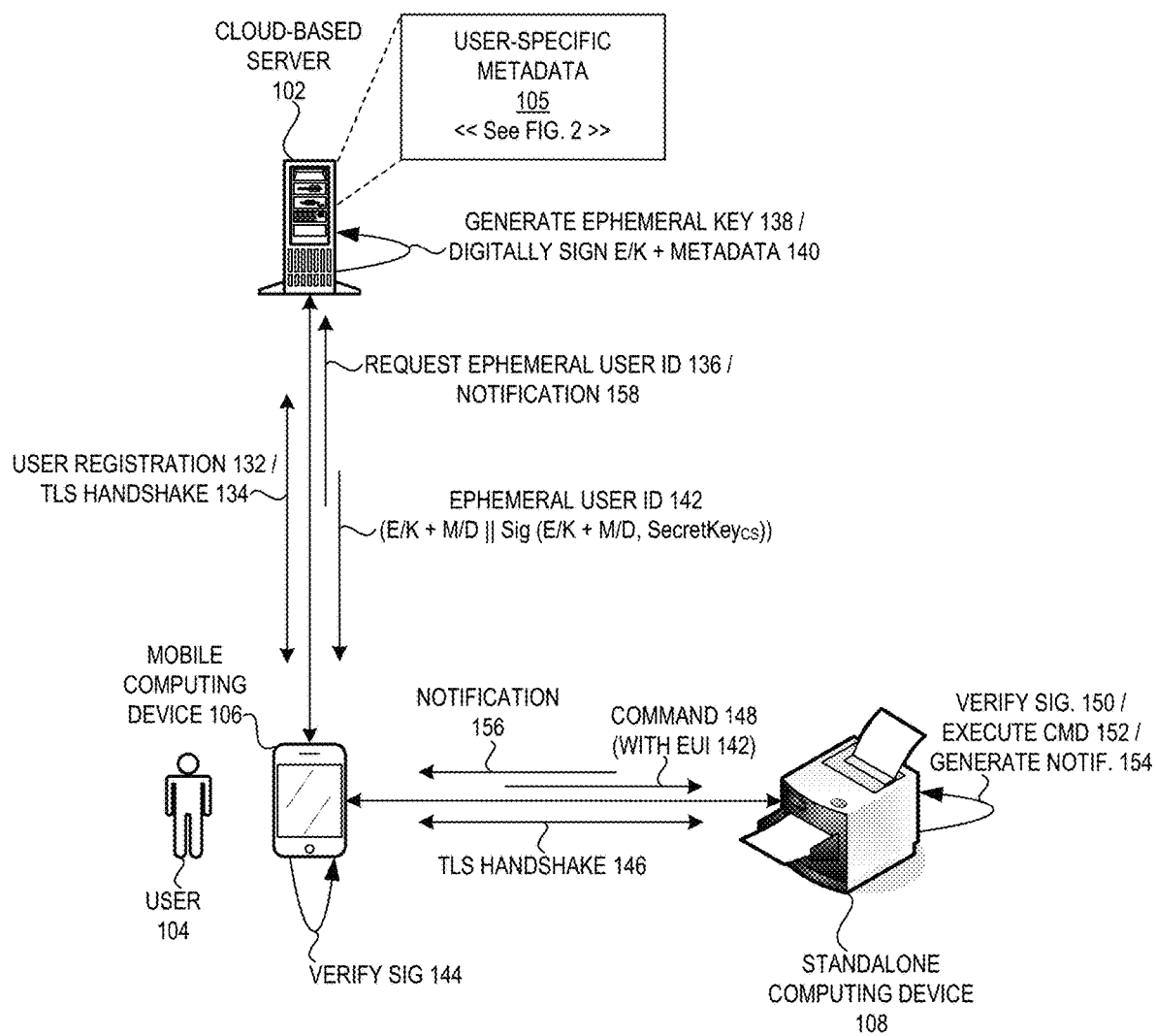
FIG. 1B illustrates an exemplary environment for facilitating user access to a standalone computing device, in accordance with an embodiment of the present invention.

FIG. 1B illustrates an exemplary environment 130 for facilitating user access to a standalone computing device, in accordance with an embodiment of the present invention. Environment 130 is similar to environment 100, and includes specific communications between the three depicted entities (i.e., cloud-based server 102, mobile computing device 106, and standalone computing device 108).

During operation, user 104 (via mobile computing device 106) can perform a user registration 132 process with cloud-based server 102, during which process user 104 can register information such as user preferences, a username, a password, and biometric information (i.e., a form of biometric recognition). Biometric recognition (e.g., body measurements and calculations) can refer to distinctive, measurable characteristics used to label and describe individuals, which can include physiological characteristics related to the shape of the body (e.g., fingerprint, palm veins, face recognition, DNA, palm print, hand geometry, iris recognition, retina, and odor/scent) as well as behavioral characteristics related to the pattern of behavior of a person (e.g., typing rhythm, gait, and voice).

User 104 can also increase or decrease a balance for a particular machine or account (e.g., by making a deposit or a withdrawal via a connected banking application or other financial application), and can perform other registration-related tasks. Cloud-based server 102 can store and maintain the registered user information in a user-specific metadata 105 table, as described below in relation to FIG. 2. User 104 (via mobile computing device 106) can establish a secure connection with cloud-based server 102 by initiating a TLS handshake 134 with cloud-based server 102.

Subsequently, user 104 (via mobile computing device 106) can request an ephemeral user identifier (communication 136). User 104 can perform this request 136 via an application or a website, and can also provide the correct password and/or biometric information when prompted (e.g., via a user interface display of mobile computing device 106). Upon receiving request 136, cloud-based server 102 can generate an ephemeral key (function 138), and obtain user-specific metadata for user 104 (i.e., metadata from table 105 which is associated with and previously registered by user 104). Metadata 140 can also include a list of roles for which user 104 is authorized, the account number of user 104, and similar auxiliary information. The list of roles can be used to circumscribe or define the functionality which can be subsequently accessed by user 104 (e.g., after successful pairing with standalone computing device 108).

Cloud-based server 102 can digitally sign the generated ephemeral key and the obtained user-specific metadata (function 140), using the secret key $SecretKey_{cs}$ of cloud-based server 102, which results in an ephemeral user identifier 142. Cloud-based server 102 can then send ephemeral user identifier 142 back to user 104 (via mobile computing device 106).

Upon receiving ephemeral user identifier 142, mobile computing device 106 can verify the digital signature (function 144), using the public key of cloud-based server 102 (i.e., $PublicKey_{cs}$), to ensure that ephemeral user identifier 142 was indeed signed and sent by cloud-based server 102. Mobile computing device 106 can obtain the public key of cloud-based server 102 prior to, during, or after user registration 132. The public key of cloud-based server 102 is easily available and obtainable by any entity which wishes to obtain this information. Upon successfully verifying the digital signature, and thus confirming that ephemeral user identifier 142 was indeed signed and sent by cloud-based sever 102 (as opposed to a malicious or unauthorized entity), mobile computing device 106 can establish a secure connection with standalone computing device 108 by initiating a TLS handshake 146 with standalone computing device 108.

Subsequently, mobile computing device 106 can generate a command 148 (which includes ephemeral user identifier 142), and send command 148 to standalone computing device 108. Upon receiving command 148, standalone computing device 108 can extract ephemeral user identifier 142, and verify the digital signature (function 150), using the public key of cloud-based server 102 (i.e., $PublicKey_{cs}$), to ensure that ephemeral user identifier 142 was indeed signed and sent by cloud-based server 102. Upon a successful verification, standalone computing device 108 can execute command 148 (function 152), generate a notification message indicating transaction information associated with the executed command (function 154), and send a notification 156 back to mobile computing device 106. This embodiment does not require a decryption key to be stored at the standalone computing device 108. Standalone computing device 108 can receive ephemeral user ID 142 in plaintext, and can verify the associated signature of cloud-based server 102 using the public key of cloud-based server 102. In one embodiment, when such a decryption key can be securely stored at standalone computing device 108, ephemeral user identifier 142 does not need to be sent in the plaintext as above, but instead can be encrypted by cloud-based server 102 using the decryption key known only to standalone computing device 108. In another embodiment, when a decryption key can be derived by standalone computing device 108 using a TLS-style handshake with cloud-based server 102, using mobile computing device 106 as an untrusted relay, again, ephemeral user identifier 142 does not need to be sent in the plaintext as above, but instead can be encrypted by cloud-based server 102 using the decryption key derived by standalone computing device 108 via the TLS-style handshake (as described below in relation to FIG. 1C).

Upon receiving notification 156, mobile computing device can send a notification 158 to cloud-based server 102, where notification 158 carries similar transaction information as indicated in notification 156. The transaction information can include, e.g., a number of pages printed, an amount of money or a cost associated with the number of pages printed, and any other relevant information associated with the transaction. Cloud-based server 102 can subsequently update user-specific metadata 105 based on the received transaction information.

Figure 1C:
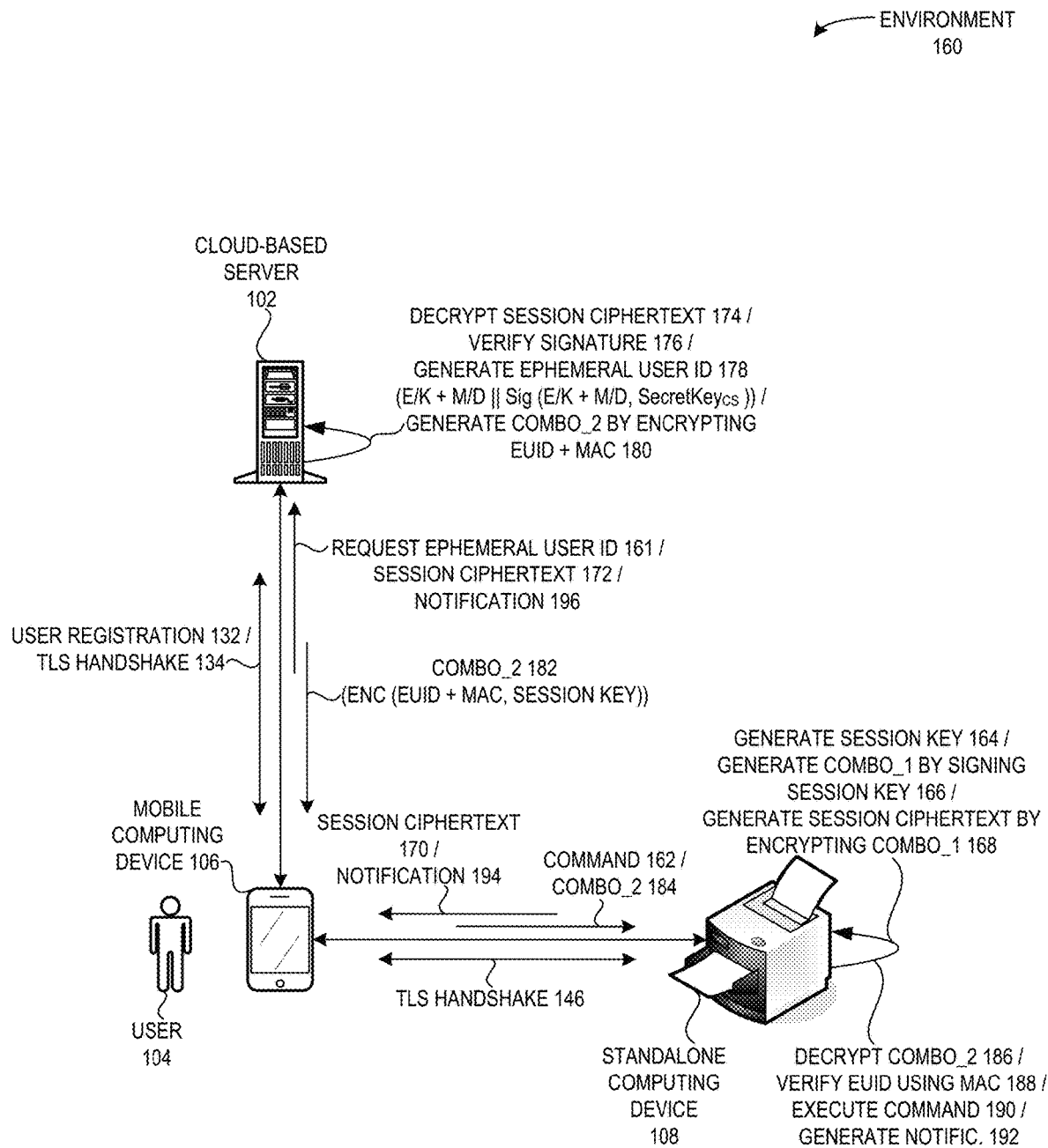
FIG. 1C illustrates an exemplary environment for facilitating user access to a standalone computing device, in accordance with an embodiment of the present invention.

FIG. 1C illustrates an exemplary environment 160 for facilitating user access to a standalone computing device, in accordance with an embodiment of the present invention. Environment 160 is similar to environment 100, and includes specific communications between the three depicted entities (i.e., cloud-based server 102, mobile computing device 106, and standalone computing device 108).

During operation, user 104 (via mobile computing device 106) can perform a user registration 132 process with cloud-based server 102, as described above in FIG. 1B. User 104 (via mobile computing device 106) can establish a secure connection with cloud-based server 102 by initiating a TLS handshake 134 with cloud-based server 102. Mobile computing device 106 can also establish a secure connection with standalone computing device 108 by initiating a TLS handshake 146 with standalone computing device 108. User 104 (via mobile computing device 106) can request an ephemeral user identifier (communication 161), and/or send a command 162 to standalone computing device 108. Upon receiving request 161, cloud-based server 102 can wait to receive session ciphertext before generating the ephemeral user identifier.

Upon receiving command 162, standalone computing device 108 can generate a session key (function 164), and generate a "combo_1" by signing the session key using a private key of standalone computing device 108 (e.g., combo_1=SIG (session key, SecretKey$_{SACD}$)) (function 166). Standalone computing device 108 can generate a "session ciphertext" by encrypting combo_1 using the public key of the cloud-based server (e.g., ENC (combo_1, PublicKey$_{cs}$)) (function 168). Standalone computing device 108 can send session ciphertext 170 to mobile device 106. Because mobile computing device 106 does not have the private key of cloud-based server 102, mobile computing device 106 cannot decipher session ciphertext 170. Instead, mobile computing device 106 can forward session ciphertext 170 (as session ciphertext 172) to cloud-based server 102.

Upon receiving session ciphertext 172, cloud-based server 102 can decrypt session ciphertext 172 using the private key of cloud-based server 102 (e.g., DEC (ENC (combo_1, PublicKey$_{cs}$), SecretKey$_{cs}$)) to obtain combo_1=SIG (session key, SecretKey$_{SACD}$) (function 174). Cloud-based server 102 can verify the signature using the public key, PublicKey$_{SACD}$, of standalone computing device 108, to verify that the session key was generated by standalone computing device 108 (function 176). Cloud-based server 102 can subsequently generate the ephemeral user identifier (EUID) (function 178). For example, cloud-based server can generate the ephemeral user identifier by generating an ephemeral key (E/K), obtaining user-specific metadata (M/D), and digitally signing the generated E/K and the obtained user-specific M/D with the private key of cloud-based server 102 (e.g., EUID=E/K+M/D∥SIG (E/K+M/D, SecretKey$_{cs}$)). Cloud-based server 102 can also generate a message authentication code (MAC) for the EUID, and generate a "combo_2" by encrypting the EUID and the MAC using the session key (e.g., ENC (EUID+MAC, session key) (function 180).

Cloud-based server 102 can send combo_2 182 to mobile computing device 106. Again, because mobile computing device 106 does not have the session key, mobile computing device 106 cannot decipher combo_2 182. Instead, mobile computing device 106 can forward combo_2 182 (as combo_2 184) to standalone computing device 108.

Upon receiving combo_2 184, standalone computing device 108 can decrypt combo_2 using the session key to obtain the EUID and the MAC (e.g., DEC ((ENC (EUID+MAC, session key)), session key)) (function 186). Standalone computing device 108 can verify the EUID using the MAC to ensure that the EUID has not been tampered with (function 188). Upon successfully verifying the EUID, standalone computing device 108 can execute the previously received command 162 (function 190), generate a notification message indicating transaction information associated with the executed command (function 192), and send a notification 194 back to mobile computing device 106. Upon receiving notification 194, mobile computing device 106 can send a notification 196 to cloud-based server 102, where notification 196 carries similar transaction information as indicated in notification 194.

Thus, in contrast to the verification communications described above in environment 130 of FIG. 1B, environment 160 depicts a different manner of performing the verification step, which allows the system to hide the ephemeral user identifier from the mobile device.

Exemplary User-Specific Metadata

FIG. 2 presents tables 210 and 230 for facilitating user access to a standalone computing device, including user-specific metadata, in accordance with an embodiment of the present invention. Table 210 can be a table with data which corresponds to a machine type 211. Table 210 can include entries with columns such as: a username 212; a cash balance 214; a page balance 216; and user preferences 218. For example, table 210 can include an entry 220, with the following values for the previously described columns: "joe.y.smith"; "$26.20"; "260 pages"; and "{portrait, double-sided, black/white}."

Similarly, table 230 can be a table with data which corresponds to a machine type 231. Table 230 can include entries with columns such as: a username 232; a cash balance 234; a page balance 236; and user preferences 238. For example, table 230 can include an entry 231, with the following values for the previously described columns: "joe.y.smith"; "$158.88"; "n/a"; and "{landscape, single-sided, color}."

Note that tables 210 and 230 are merely exemplary tables, and can include other columns and values not depicted. For example, user-specific metadata 200 can include one table which incorporates information for multiple machine types. User-specific metadata 200 can also include other user preferences, including account number, payment type, frequency of payment, collation preferences, nicknames, information which identifies the user, and any options relating to a standalone computing device.

Tables 210 and 230 represent exemplary user account and preference information stored in the cloud-based server (e.g., cloud-based server 102 of FIG. 1B). User-specific metadata 200 may include some Personally Identifiable Information (PII), such as the user's name, account number, nicknames, and information which identifies the user. As described above, in some embodiments, the ephemeral user identifier is sent in plaintext with signature verification. In these instances, to ensure that no PII is sent over a communication channel (i.e., over communication protocols 110 and 112 of FIG. 1A), cloud-based server 102 can generate or derive the ephemeral user identifier (e.g., functions 138 and 140 of FIG. 1B), based on the user-specific metadata of tables 210 and 230 (including any PII), as a numeric string. This numeric string is subsequently sent to mobile computing device 106 as ephemeral user identifier 142 of FIG. 1B. Thus, while the rows in tables 210 and 230 indicate PII, a random string derived from the PII would not indicate PII.

Method for Facilitating User Access to a Standalone Computing Device

Figure 3A:
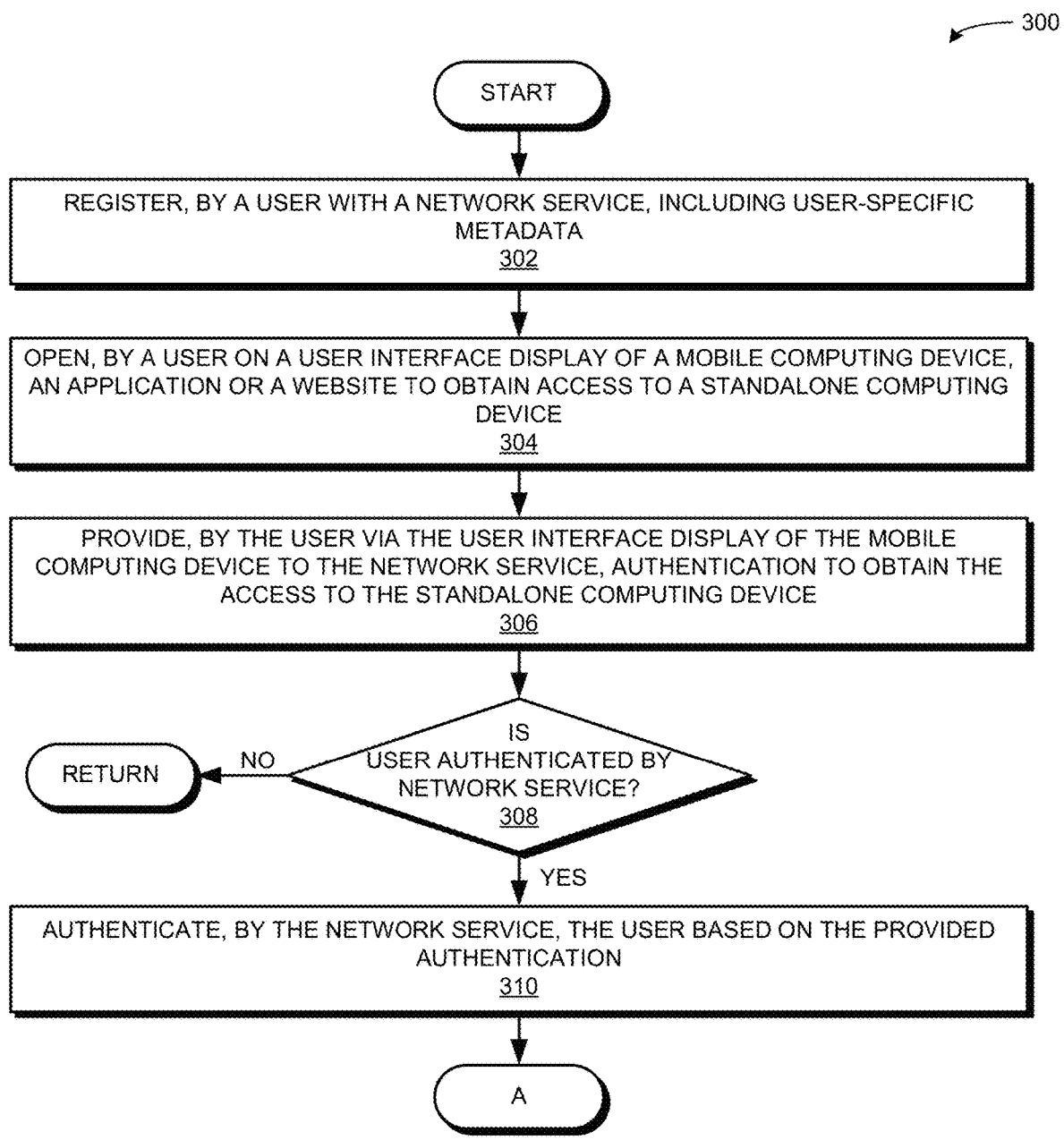
FIG. 3A presents a flow chart illustrating a method for facilitating user access to a standalone computing device, in accordance with an embodiment of the present invention.

FIG. 3A presents a flow chart 300 illustrating a method for facilitating user access to a standalone computing device, in accordance with an embodiment of the present invention. During operation, a user registers with a network service, and includes user-specific metadata (operation 302). The user may register via a mobile computing device of the user, or via another client computing device which can accept as input the required account credentials. For example, if the required credentials include a form of biometric recognition, which can only be accepted as input on a mobile computing device, then the user must use an appropriate mobile computing device. However, if the required credentials include a user name or password which can be input via a text-based editor or application, the user may use any client computing device to perform the registration. The user-specific metadata can include, e.g., user preferences for printing to a specific type of machine, payment preferences, etc., as shown above in relation to FIG. 2.

The user opens, on a user interface display of a mobile computing device, an application or a website to obtain access to a standalone computing device (operation 304). The user provides, via the user interface display of the mobile computing device to the network service, authentication to obtain the access to the standalone computing device (operation 306). The authentication can be a password or a form of biometric recognition via a component of the mobile computing device.

If the user is not authenticated by the network service (decision 308), the operation returns. If the user is authenticated by the network service (decision 308), the network service authenticates the user based on the provided authentication (operation 310), and the operation continues at Label A of FIG. 3B. In some embodiments, the user authentication information can be obtained or verified using a third-party identity provider via a protocol such as OAuth using, e.g., a Google or Facebook account belonging to the user.

Figure 3B:
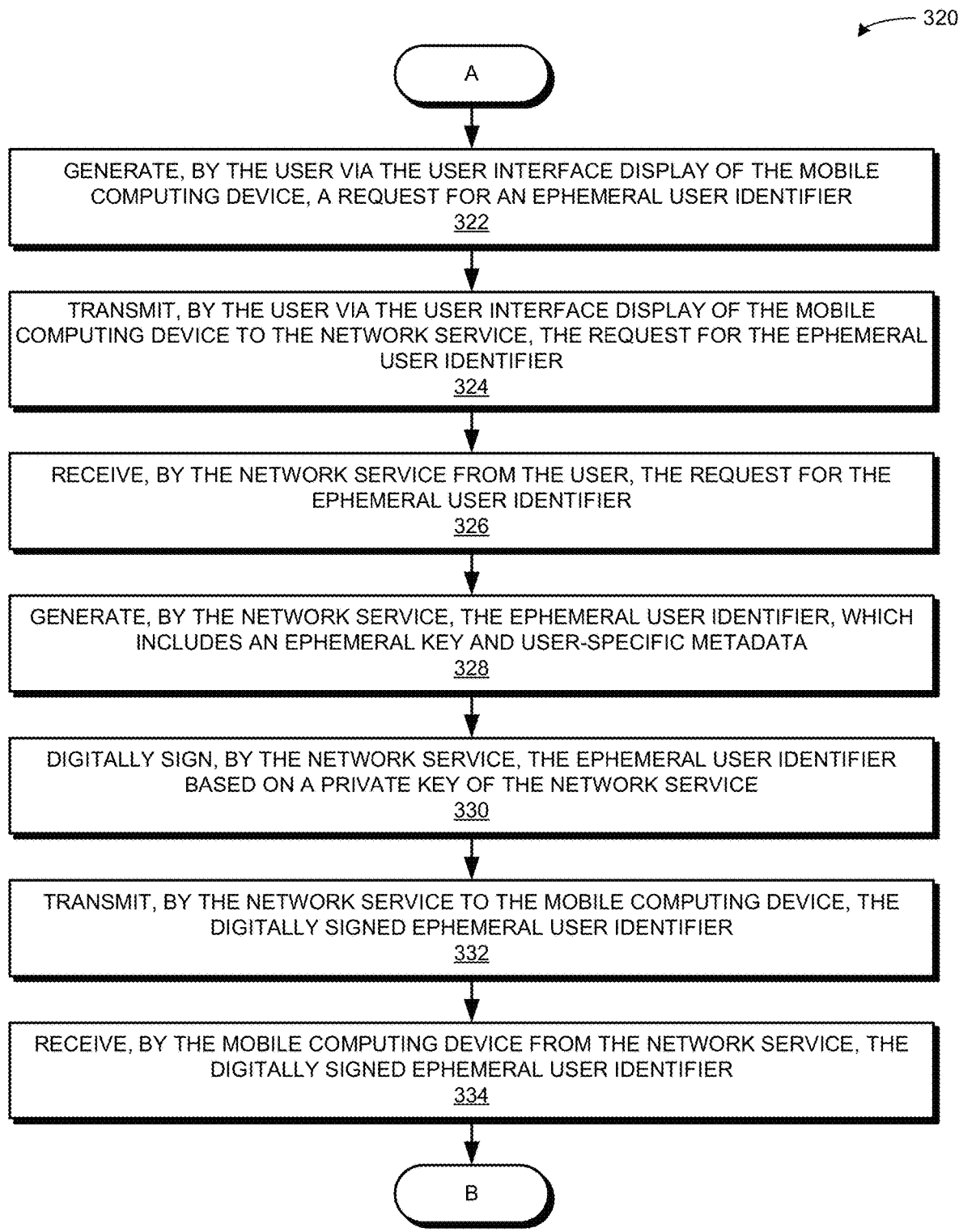
FIG. 3B presents a flow chart illustrating a method for facilitating user access to a standalone computing device, in accordance with an embodiment of the present invention.

FIG. 3B presents a flow chart 320 illustrating a method for facilitating user access to a standalone computing device, in accordance with an embodiment of the present invention. The user generates, via the user interface display of the mobile computing device, a request for an ephemeral user identifier (operation 322). The request may occur automatically upon a successful authentication by the network service, e.g., when the user enters a specific application or website to access a particular standalone computing device, and successfully enters the correct account credentials. The request may also be part of another command or message which requests access to the standalone computing device or to the capabilities of the standalone computing device (e.g., printing a document on a multi-function printer, or accessing a sensor or reading on an IoT device).

The user transmits, via the user interface display of the mobile computing device to the network service, the request for the ephemeral user identifier (operation 324). The network service receives, from the user, the request for the ephemeral user identifier (operation 326). The network service generates the ephemeral user identifier, which includes an ephemeral key and user-specific metadata (operation 328). The user-specific metadata may be stored by the network service. The network service digitally signs the ephemeral user identifier based on a private key of the network service (operation 330). The network service transmits, to the mobile computing device, the digitally signed ephemeral user identifier (operation 332). The mobile computing device receives, from the network service, the digitally signed ephemeral user identifier (operation 334), and the operation continues at Label B of FIG. 3C.

Figure 3C:
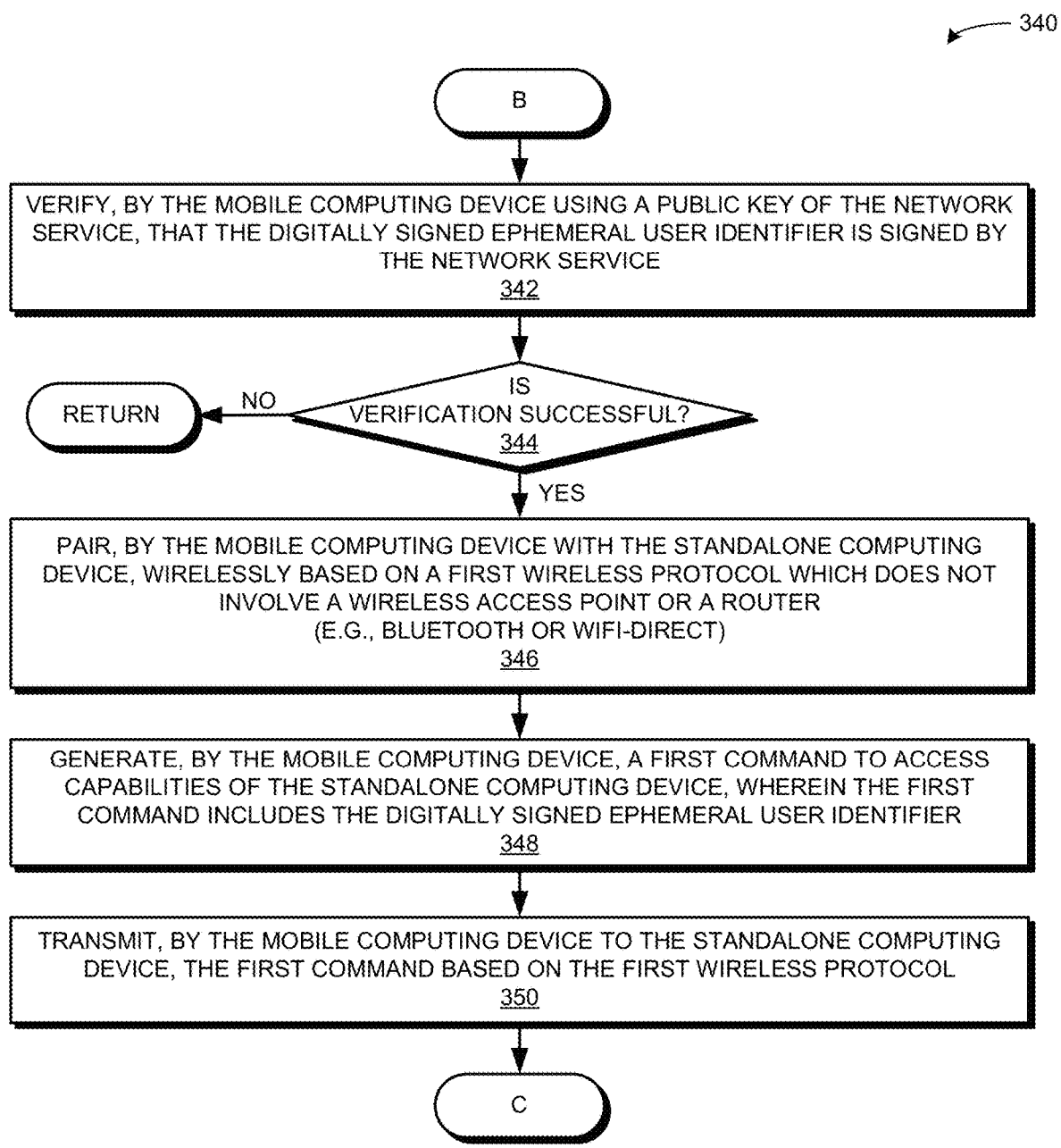
FIG. 3C presents a flow chart illustrating a method for facilitating user access to a standalone computing device, in accordance with an embodiment of the present invention.

FIG. 3C presents a flow chart 340 illustrating a method for facilitating user access to a standalone computing device, in accordance with an embodiment of the present invention. The mobile computing device verifies, using a public key of the network service, that the digitally signed ephemeral user identifier is signed by the network service (operation 342). Note that the public key of the network service is available to any entity which wishes to obtain it, and may be provided to the user during the registration process of operation 302. If the verification is not successful (decision 344), the operation returns.

If the verification is successful (decision 344), the mobile computing device pairs wirelessly with the standalone computing device based on a first wireless protocol which does not involves a wireless access point or a wireless router (e.g., Bluetooth, Wi-Fi direct, or NFC) (operation 346). The mobile computing device generates a first command to access capabilities of the standalone computing device, wherein the first command includes the digitally signed ephemeral user identifier (operation 348). The mobile computing device transmits, to the standalone computing device, the first command based on the first wireless protocol (operation 350), and the operation continues at Label C of FIG. 3D.

Figure 3D:
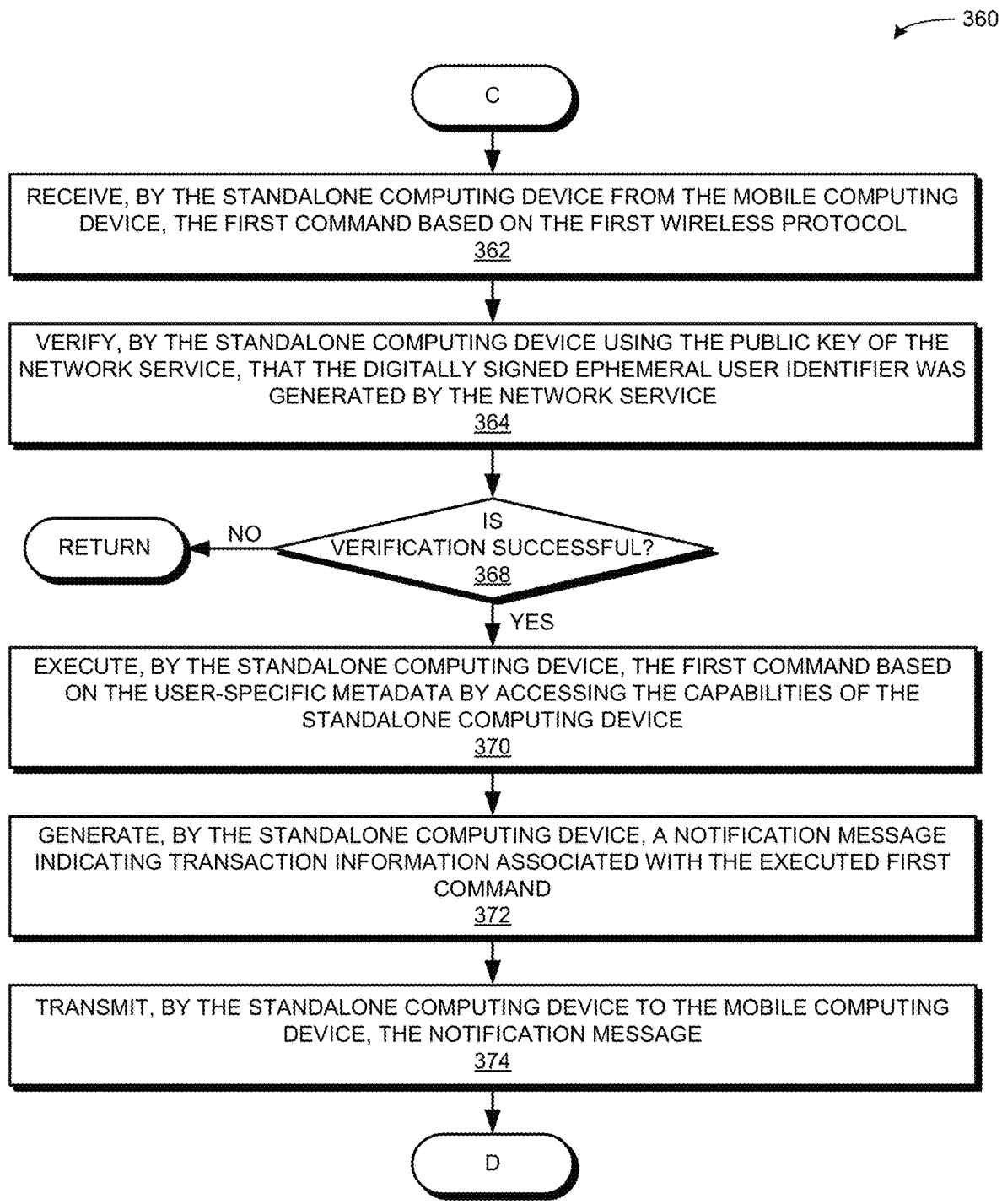
FIG. 3D presents a flow chart illustrating a method for facilitating user access to a standalone computing device, in accordance with an embodiment of the present invention.

FIG. 3D presents a flow chart 360 illustrating a method for facilitating user access to a standalone computing device, in accordance with an embodiment of the present invention. During operation, the standalone computing device receives, from the mobile computing device, the first command based on the first wireless protocol (operation 362). The standalone computing device verifies, using the public key of the network service, that the digitally signed ephemeral user identifier was generated by the network service (operation 364). The public key of the network service may be provided to the standalone computing device as part of its firmware during manufacturing, a firmware upgrade, or other process.

In some embodiments, the verification step (operation 364) may be performed differently, as described above in relation to FIG. 1C. Specifically, it may be desirable to hide the ephemeral user identifier from the mobile computing device altogether. The motivation for hiding the ephemeral user identifier is to hide the user-specific metadata which is used in the construction of the ephemeral user identifier. To achieve this, the ephemeral user identifier can be encrypted in such a way that only the standalone computing device, but not the mobile computing device, is able to decrypt the identifier, and verify that it was indeed generated by the network service, or equivalently, the cloud-based server. This is achieved by means of a TLS-style handshake between the cloud-based server and the standalone computing device using the mobile computing device as an untrusted relay.

One requirement for this embodiment to work is that the standalone computing device should possess a public encryption key and a private decryption key of its own, and the standalone computing device should possess a hardware resource, such as a Trusted Platform Module, to securely store the decryption key. When this requirement is fulfilled, the standalone computing device can generate a so-called "session key," sign the session key with its own private decryption key, and encrypt the combination of the session key and the signature using the public encryption key of the cloud server, to generate a session ciphertext. The standalone computing device can transmit the session ciphertext to the mobile computing device, which can subsequently forward the session ciphertext to the cloud-based server.

In such an embodiment, the mobile computing device can neither decrypt the session ciphertext nor verify the signature of the standalone computing device. The cloud-based server can, on the other hand, decrypt the session ciphertext using its decryption key to obtain the session key and the signature. The cloud-based server can then verify the signature based on the public encryption key of the standalone computing device, to gain assurance that the session key was indeed generated by the standalone computing device. Next, the cloud-based server can generate an encryption of the ephemeral user identifier and a message authentication code (MAC) using the session key, and transmit this combination to the mobile computing device, which can forward this combination to the standalone computing device. Note that the mobile computing device does not know the session key, and hence cannot decrypt this combination. The standalone computing device, however, can use the session key to decrypt the received combination, revealing the ephemeral user identifier and using the MAC to verify that the message has not been tampered with during transmission.

If the verification is not successful (decision 368), the operation returns. If the verification is successful (decision 368), the standalone computing device executes the first command based on the user-specific metadata by accessing the capabilities of the standalone computing device (operation 370). The first command can include a command to, e.g., print a document on the standalone computing device (as in a multi-function printer), obtain a reading from a sensor of the standalone computing device (as in an IoT-capable device), or perform a certain physical task (as in a robot). The standalone computing device generates a notification message indicating transaction information associated with the executed first command (operation 372). The transaction information can include, e.g., a number of pages printed, an amount of data consumed, a response to a request for a monitor reading, etc. The standalone computing device transmits, to the mobile computing device, the notification message (operation 374), and the operation continues at Label D of FIG. 3E.

Figure 3E:
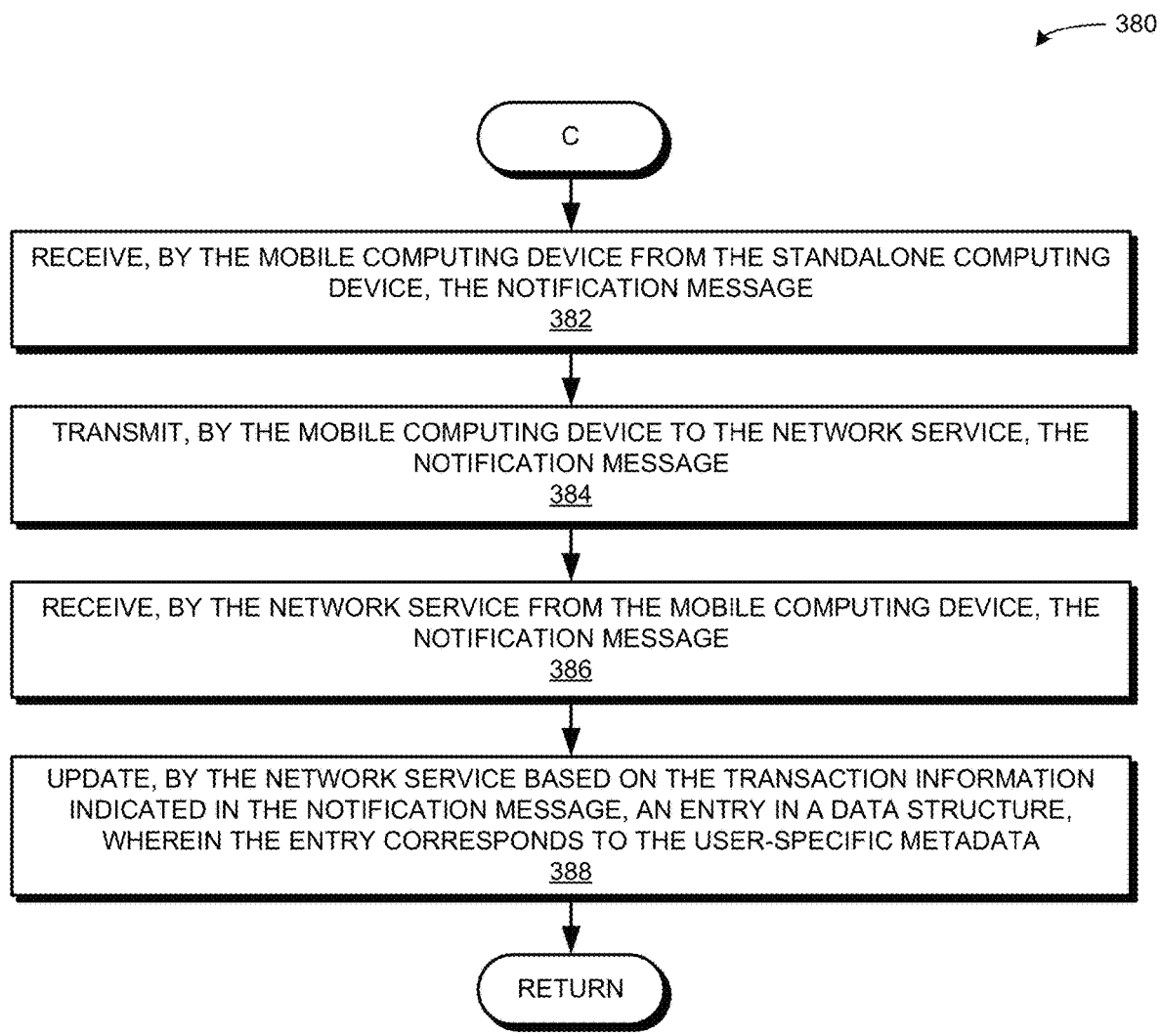
FIG. 3E presents a flow chart illustrating a method for facilitating user access to a standalone computing device, in accordance with an embodiment of the present invention.

FIG. 3E presents a flow chart 380 illustrating a method for facilitating user access to a standalone computing device, in accordance with an embodiment of the present invention. During operation, the mobile computing device receives, from the standalone computing device, the notification message (operation 382). The mobile computing device transmits, to the network service, the notification message (operation 384). The network service receives, from the mobile computing device, the notification message (operation 386). The network service updates, based on the transaction information indicated in the notification message, an entry in a data structure, wherein the entry corresponds to the user-specific metadata (operation 388). In some embodiments, the notification message generated by the standalone computing device is in plaintext and visible to the mobile computing device. In other embodiments, for example when the notification message contains information pertaining to the cost of the services rendered by the standalone computing device, it is beneficial to encrypt the notification message to hide its contents from the mobile computing device, and to prevent the mobile computing device from changing the contents. This is achieved in a straightforward way by encrypting the notification message using the public key of the cloud-based server or the network service. In yet another embodiment, the notification message may be encrypted using a key derived from the session key established between the standalone computing device and the cloud-based server (or network service). Specifically, since the session key can be securely updated (also referred to as "rotated" or changed) at frequent intervals, this last embodiment is preferable when there is a requirement to provide "forward secrecy," a concept known in the art, that discourages an adversary from storing encrypted messages in the hope that a compromised session key from a future attack can be used to decrypt those stored past messages.

Figure 4:
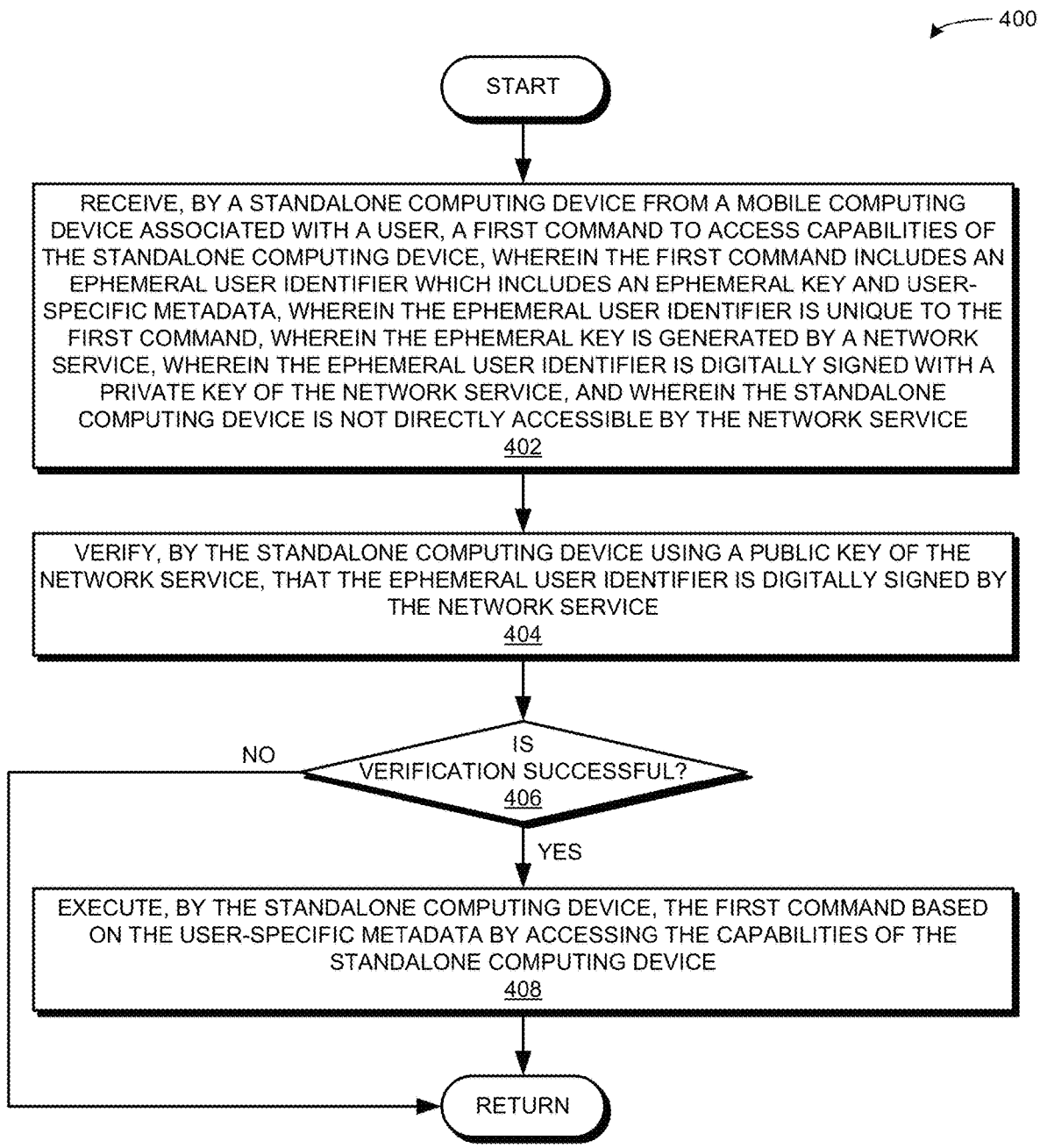
FIG. 4 presents a flow chart illustrating a method by a standalone computing device for facilitating user access to the standalone computing device, in accordance with an embodiment of the present invention.

Method by a Standalone Computing Device for Facilitating Access to the Physical Capabilities of the Standalone Computing Device FIG. 4 presents a flow chart 400 illustrating a method by a standalone computing device for facilitating user access to the standalone computing device, in accordance with an embodiment of the present invention. During operation, the system receives, by a standalone computing device from a mobile computing device associated with a user, a first command to access capabilities of the standalone computing device, wherein the first command includes an ephemeral user identifier which includes an ephemeral key and user-specific metadata, wherein the ephemeral user identifier is unique to the first command, wherein the ephemeral key is generated by a network service, wherein the ephemeral user identifier is digitally signed with a private key of the network service, and wherein the standalone computing device is not directly accessible by the network service (operation 402). The system verifies, by the standalone computing device using a public key of the network service, that the ephemeral user identifier is digitally signed by the network service (operation 404). If the verification is not successful (decision 406), the operation returns. If the verification is successful (decision 406), the system executes, by the standalone computing device, the first command based on the user-specific metadata by accessing the capabilities of the standalone computing device (operation 408).

Exemplary Computer and Communication System; Exemplary Apparatus

Figure 5:
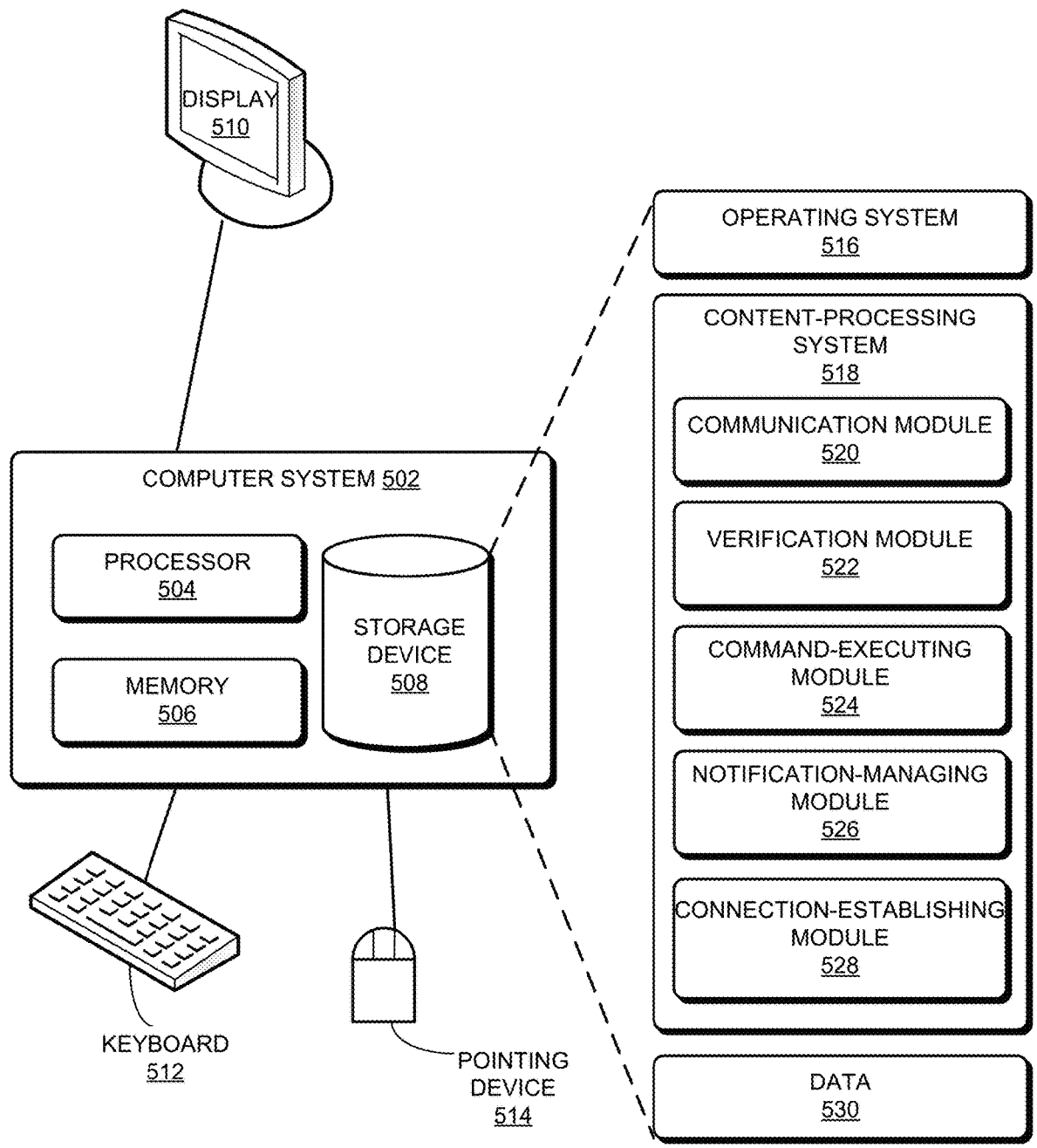
FIG. 5 illustrates an exemplary distributed computer and communication system that facilitates user access to a standalone computing device, in accordance with an embodiment of the present invention.

FIG. 5 illustrates an exemplary distributed computer and communication system 500 that facilitates user access to a standalone computing device, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 530.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network or via a wireless protocol which does not involve a wireless access point or a router (communication module 520). A data packet can include data, a registration request, an ephemeral user identifier, a command, and a notification.

Content-processing system 518 can further include instructions for receiving, by the standalone computing device from a mobile computing device associated with a user, a first command to access capabilities of the standalone computing device, wherein the first command includes an ephemeral user identifier which includes an ephemeral key and user-specific metadata, wherein the ephemeral user identifier is unique to the first command, wherein the ephemeral key is generated by a network service, wherein the ephemeral user identifier is digitally signed with a private key of the network service, and wherein the standalone computing device is not directly accessible by the network service (communication module 520). Content-processing system 518 can also include instructions for verifying, by the standalone computing device using a public key of the network service, that the ephemeral user identifier is digitally signed by the network service (verification module 522). Content-processing system 518 can include instructions for executing, by the standalone computing device, the first command based on the user-specific metadata by accessing the capabilities of the standalone computing device (command-executing module 524).

Content-processing system 518 can additionally include instructions for transmitting, by the standalone computing device to the mobile computing device, a notification indicating a successful execution of the first command (notification-managing module 526). Content-processing system 518 can include instructions for pairing, by the standalone computing device, with the mobile computing device wirelessly based on one or more of: WiFi-Direct; Bluetooth; NFC; a wireless protocol; and a wireless protocol which does not involve a wireless access point or a wireless router (connection-establishing module 528).

Content-processing system 518 can also include instructions for establishing a first secure connection based on a Transport Layer Security protocol between the mobile computing device and the network service (connection-establishing module 528). Content-processing system 518 can also include instructions for establishing a second secure connection based on the Transport Layer Security protocol between the mobile computing device and the standalone computing device (connection-establishing module 528).

Data 530 can include any data that is required as input or that is generated as output by the methods and/or processes described in this disclosure. Specifically, data 530 can store at least: a command; an ephemeral user identifier; an ephemeral key; user-specific metadata; a digitally signed ephemeral user identifier; an indicator or identifier of a network service; an indicator or identifier of a user associated with a mobile computing device; an indicator or identifier of the mobile computing device; an indicator or identifier of a standalone computing entity; a public key; a private key; a notification; a notification message; a message; transaction information associated with an executed command; an indicator of a successful pairing via a wireless protocol which does not involve a wireless access point or a wireless router; an indicator of a successful connection established between two entities; information to support a connection via a Transport Layer Security protocol; and an indicator or identifier of a multi-function printer, an IoT-capable device, and a robot.

Figure 6:
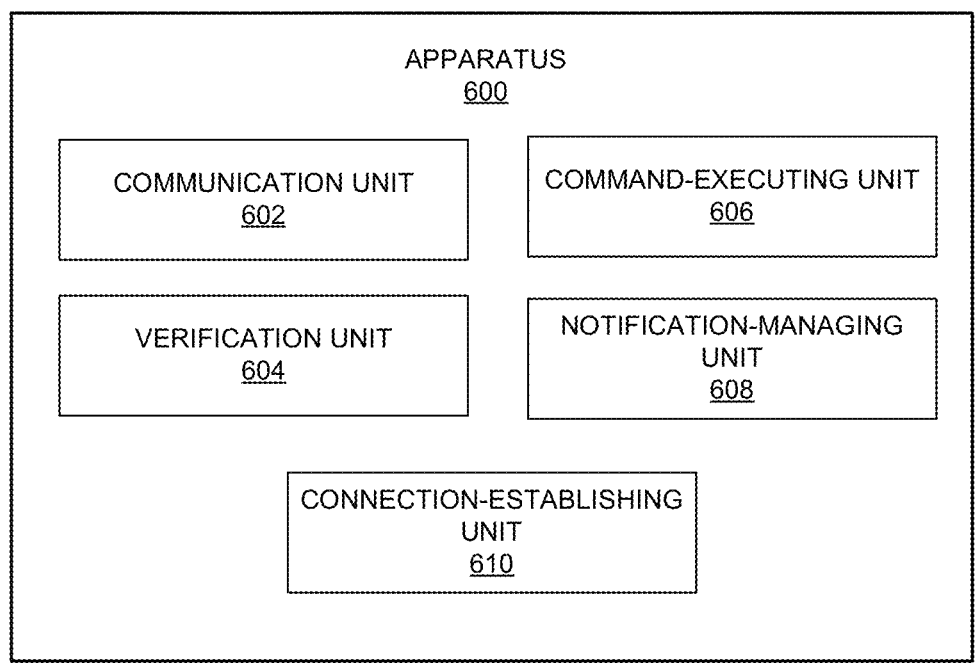
FIG. 6 illustrates an exemplary apparatus that facilitates user access to a standalone computing device, in accordance with an embodiment of the present application.

FIG. 6 illustrates an exemplary apparatus 600 that facilitates user access to a standalone computing device, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Specifically, apparatus 600 can comprise units 602-610 which perform functions or operations similar to modules 520-528 of computer system 502 of FIG. 5, including: a communication unit 602; a verification unit 604; a command-executing unit 606; a notification-managing unit 608; and a connection-establishing unit 610.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating user access to a standalone computing device, the method comprising:

receiving, by the standalone computing device from a mobile computing device associated with a user, a first command to access capabilities of the standalone computing device, wherein the first command includes an ephemeral user identifier, wherein the ephemeral user identifier includes an ephemeral key and user-specific metadata,
wherein the ephemeral key is unique to and generated for the first command by a network service which is not directly accessible by the standalone computing device,
wherein the user-specific metadata is previously registered by the user and stored by the network service, and
wherein the ephemeral user identifier is digitally signed with a private key of the network service;
verifying, by the standalone computing device using a public key of the network service, that the digitally signed ephemeral user identifier was generated by the network service; and
causing the user access to the standalone computing device by executing, by the standalone computing device, the first command based on the user-specific metadata by accessing the capabilities of the standalone computing device.

2. The method of claim 1, further comprising:
transmitting, by the standalone computing device to the mobile computing device, a notification indicating a successful execution of the first command,
wherein the mobile computing device transmits the notification to the network service, which causes the network service to update an entry in a data structure, and
wherein the entry corresponds to the user-specific metadata.

3. The method of claim 1, further comprising:
pairing, by the standalone computing device, with the mobile computing device wirelessly based on one or more of:
WiFi-Direct;
Bluetooth;
Near Field Communication (NFC);
a wireless protocol; and
a wireless protocol which does not involve a wireless access point or a wireless router.

4. The method of claim 1, wherein the digitally signed ephemeral user identifier is received by the mobile computing device prior to the standalone computing device receiving the first command, and
wherein prior to the user receiving the digitally signed ephemeral user identifier, the user is authenticated by the network service based on or more of:
an application on the mobile computing device;
a website;
a form of biometric recognition via a component of the mobile computing device; and
a password of the user to access the application or the website.

5. The method of claim 1,
wherein the ephemeral user identifier is transmitted via a network from the network service to the mobile computing device,
wherein the ephemeral user identifier is further verified by the mobile computing device using the public key of the network service prior to transmitting the first command to the standalone computing device,
wherein the first command is transmitted by the mobile computing device to the standalone computing device, and
wherein the user-specific metadata is stored by the network service, which allows the standalone computing device to verify that the mobile computing device is associated with a user which has been previously authorized by the network service.

6. The method of claim 1,
wherein the ephemeral user identifier is hidden from the mobile computing device based on an encryption of the ephemeral user identifier and a message authentication code,
wherein the encryption is performed using a session key derived based on a secure cryptographic handshake protocol between the standalone computing device and the network service, and
wherein the secure cryptographic handshake protocol utilizes the mobile computing device as an untrusted relay.

7. The method of claim 1, wherein the network service comprises a cloud-based server, and wherein the standalone computing device is not connected to the cloud-based server via any networks or any wireless access points.

8. The method of claim 1,
wherein prior to the network service transmitting the digitally signed ephemeral user identifier to the mobile computing device, the method further comprises establishing a first secure connection based on a Transport Layer Security protocol between the mobile computing device and the network service; and
wherein prior to the standalone computing device receiving the first command, the method further comprises establishing a second secure connection based on the Transport Layer Security protocol between the mobile computing device and the standalone computing device.

9. The method of claim 1, wherein the standalone computing device is one or more of:
a multifunction printer;
an Internet of Things (IoT)-capable device; and
a robot.

10. A computer system for facilitating user access to a standalone computing device, the computer system comprising:
a processor; and
a storage device storing instructions that when executed by the processor cause the processor to perform a method, the method comprising:
receiving, by the standalone computing device from a mobile computing device associated with a user, a first command to access capabilities of the standalone computing device, wherein the first command includes an ephemeral user identifier,
wherein the ephemeral user identifier includes an ephemeral key and user-specific metadata,
wherein the ephemeral key is unique to and generated for the first command by a network service which is not directly accessible by the standalone computing device,
wherein the user-specific metadata is previously registered by the user and stored by the network service, and
wherein the ephemeral user identifier is digitally signed with a private key of the network service;
verifying, by the standalone computing device using a public key of the network service, that the digitally signed ephemeral user identifier was generated by the network service; and
causing the user access to the standalone computing device by executing, by the standalone computing device, the first command based on the user-specific metadata by accessing the capabilities of the standalone computing device.

11. The computer system of claim 10, further comprising:
transmitting, by the standalone computing device to the mobile computing device, a notification indicating a successful execution of the first command,
wherein the mobile computing device transmits the notification to the network service, which causes the network service to update an entry in a data structure, and
wherein the entry corresponds to the user-specific metadata.

12. The computer system of claim 10, wherein the method further comprises:
pairing, by the standalone computing device, with the mobile computing device wirelessly based on one or more of:
WiFi-Direct;
Bluetooth;
Near Field Communication (NFC);
a wireless protocol; and
a wireless protocol which does not involve a wireless access point or a wireless router.

13. The computer system of claim 10, wherein the digitally signed ephemeral user identifier is received by the mobile computing device prior to the standalone computing device receiving the first command, and
wherein prior to the user receiving the digitally signed ephemeral user identifier, the user is authenticated by the network service based on or more of:
an application on the mobile computing device;
a website;
a form of biometric recognition via a component of the mobile computing device; and
a password of the user to access the application or the website.

14. The computer system of claim 10,
wherein the ephemeral user identifier is transmitted via a network from the network service to the mobile computing device,
wherein the ephemeral user identifier is further verified by the mobile computing device using the public key of the network service prior to transmitting the first command to the standalone computing device,
wherein the first command is transmitted by the mobile computing device to the standalone computing device, and
wherein the user-specific metadata is stored by the network service, which allows the standalone computing device to verify that the mobile computing device is associated with a user which has been previously authorized by the network service.

15. The computer system of claim 10,
wherein the ephemeral user identifier is hidden from the mobile computing device based on an encryption of the ephemeral user identifier and a message authentication code,
wherein the encryption is performed using a session key derived based on a secure cryptographic handshake protocol between the standalone computing device and the network service, and
wherein the secure cryptographic handshake protocol utilizes the mobile computing device as an untrusted relay.

16. The computer system of claim 10, wherein the network service comprises a cloud-based server, and wherein the standalone computing device is not connected to the cloud-based server via any networks or any wireless access points.

17. The computer system of claim 10,
wherein prior to the network service transmitting the digitally signed ephemeral user identifier to the mobile computing device, the method further comprises establishing a first secure connection based on a Transport Layer Security protocol between the mobile computing device and the network service; and
wherein prior to the standalone computing device receiving the first command, the method further comprises establishing a second secure connection based on the Transport Layer Security protocol between the mobile computing device and the standalone computing device.

18. The computer system of claim 10, wherein the standalone computing device is one or more of:
a multifunction printer;
an Internet of Things (IoT)-capable device; and
a robot.

19. An apparatus for facilitating user access to a standalone computing device, the apparatus comprising:
a communication module configured to receive, by the standalone computing device from a mobile computing device associated with a user, a first command to access capabilities of the standalone computing device, wherein the first command includes an ephemeral user identifier,
wherein the ephemeral user identifier includes an ephemeral key and user-specific metadata,
wherein the ephemeral key is unique to and generated for the first command by a network service which is not directly accessible by the standalone computing device,
wherein the user-specific metadata is previously registered by the user and stored by the network service, and
wherein the ephemeral user identifier is digitally signed with a private key of the network service;
a verification module configured to verify, by the standalone computing device using a public key of the network service, that the digitally signed ephemeral user identifier was generated by the network service; and
a command-executing module configured to cause user access to the standalone computing device by executing, by the standalone computing device, the first command based on the user-specific metadata by accessing the capabilities of the standalone computing device.

20. The apparatus of claim 19,
wherein the ephemeral user identifier is transmitted via a network from the network service to the mobile computing device,
wherein the ephemeral user identifier is further verified by the mobile computing device using the public key of the network service prior to transmitting the first command to the standalone computing device,
wherein the first command is transmitted by the mobile computing device to the standalone computing device, and
wherein the user-specific metadata is stored by the network service, which allows the standalone computing device to verify that the mobile computing device is associated with a user which has been previously authorized by the network service.

* * * * *